United States Patent Office 3,197,981
Patented Aug. 3, 1965

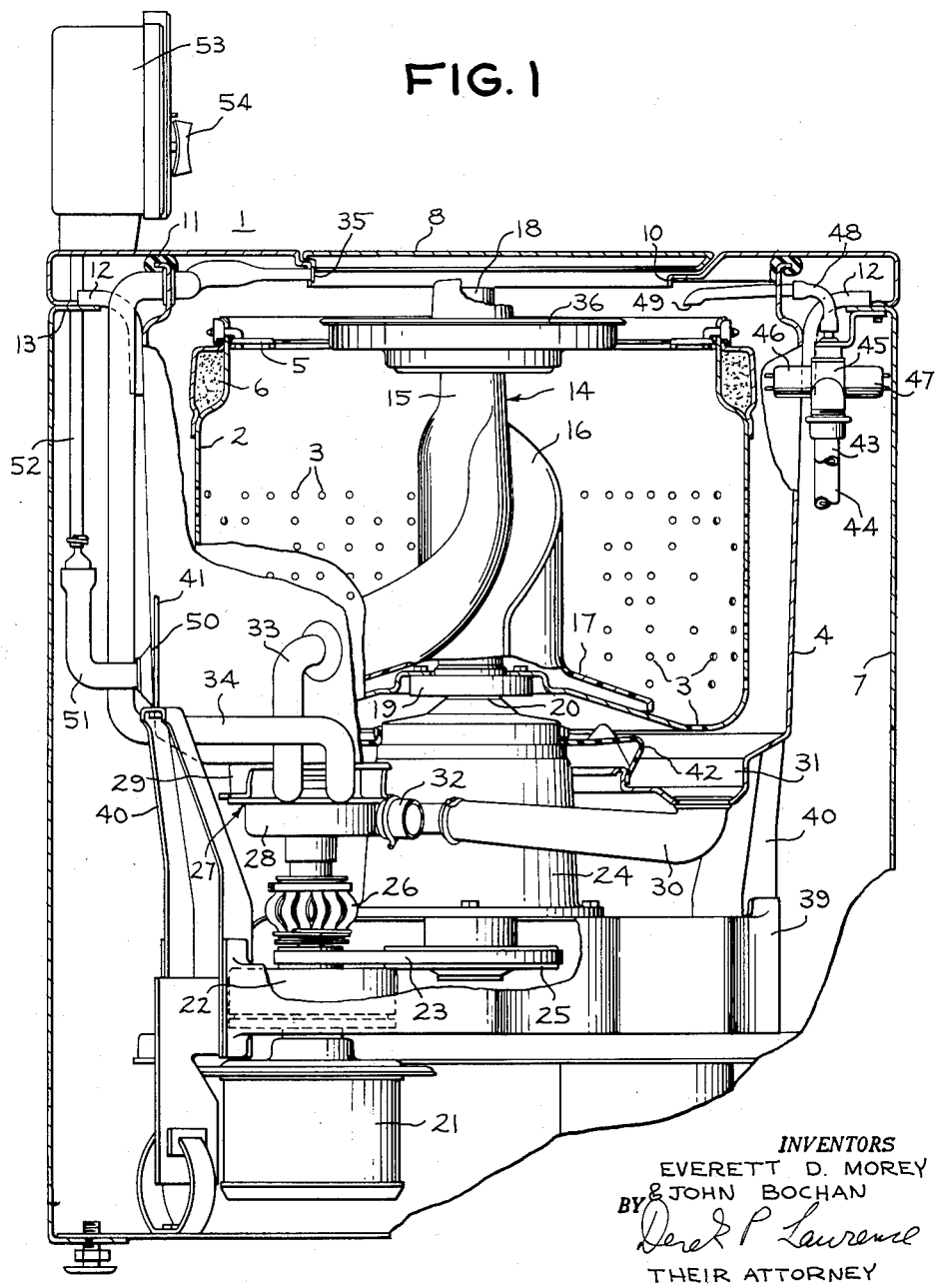

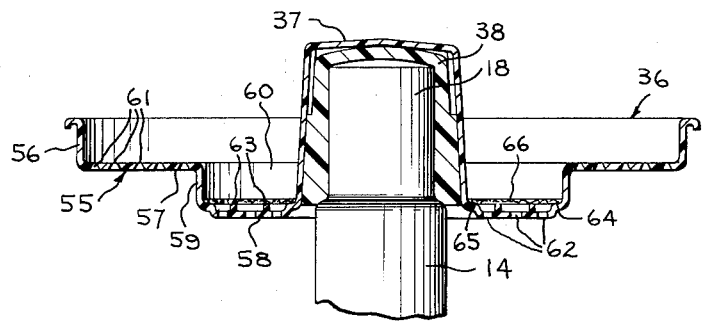
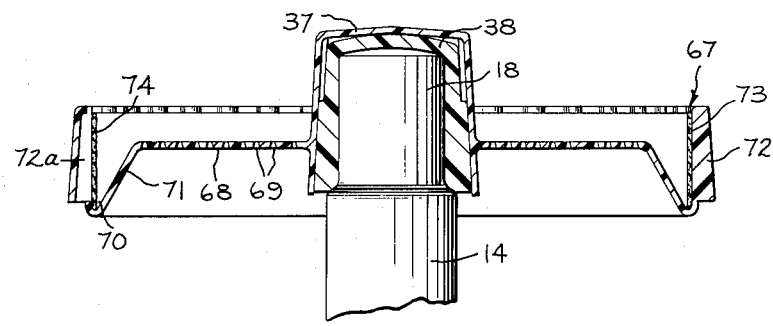
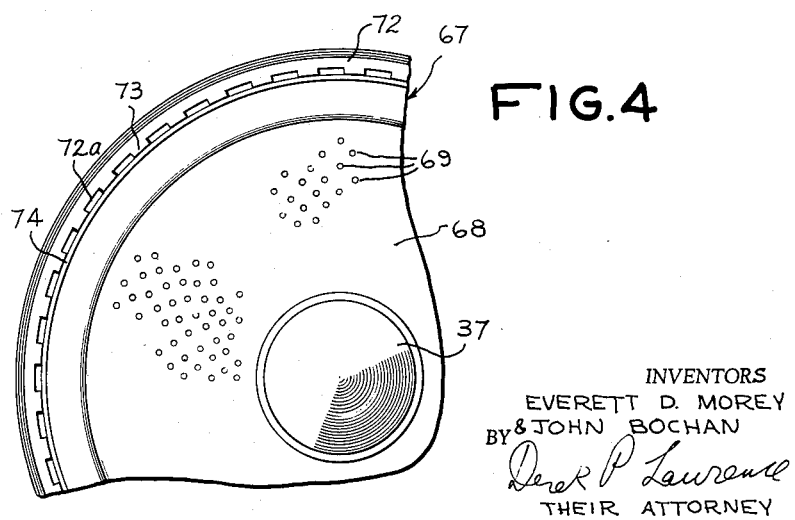

3,197,981
FILTER PAN PARTICULARLY SUITED FOR USE IN CLOTHES WASHERS AND THE LIKE
Everett D. Morey and John Bochan, Louisville, Ky., assignors to General Electric Company, a corporation of New York
Filed Aug. 28, 1963, Ser. No. 305,121
8 Claims. (Cl. 68—18)

This invention relates to filter pans, and more particularly to the type of filter pans adapted to be used in washing machines to filter out lint and fine particulate soil.

The practice of filtering lint out of the water used to wash clothes in automatic clothes washing machines is well known, and many machines, presently commercially available, have some expedient for effecting this. The filtering of fine particulate matter out of the wash water is also well known to those in the art as being highly desirable; however, to date, no way of conveniently achieving this in a commercially sold domestic clothes washer has been found.

This difference between the filtering of lint and the filtering of fine particulate matter has arisen, at least in part, because lint may be filtered by a device having relatively large openings which allow a substantial amount of flow therethrough. The filtering of fine particulate matter, on the other hand, requires a filter whose openings are so small as to substantially slow down the flow. Another factor is that it has been found possible to make a lint filter which may readily be cleaned, or which is self-cleaning. However, fine particulate matter, with its even greater tendency to adhere to a filter, is not so susceptible of removal.

Despite these difficulties with respect to the filtering of fine particulate matter, it remains a highly desirable goal since it is such particles which are responsible for the grayish cast often present in the white color of clothes. With the advent of detergents as the agents most used in domestic washers, it becomes even more important to effect filtering of the fine particles; with soap, the chemical composition is such that redeposition of the particles on the clothes is substantially inhibited; with detergents, however, this is not the case, and redeposition can be prevented only to a certain extent by the addition of appropriate chemicals such as carboxy methyl cellulose.

In view of the foregoing, it is a prime object of our invention to provide a filter pan which may be used in a washing machine to effect the filtering of lint and of the fine particulate matter in a convenient manner.

A more specific object of our invention is the provision of such a pan wherein the filtering of the particulate matter is effected by passage of liquid through a sheet of filtering material which is retained in the pan and which may readily be disposed of subsequent to one or more washing operations.

A further specific object of our invention is the provision of such a filter pan which is adapted to be seated on the top of the agitator in a washing machine, above the liquid level, so as to receive a stream of water being recirculated from the main body of liquid in the machine, and to effect the dual filtering action (lint and particulate matter) thereon.

In one aspect of our invention, we provide a filter pan intended to filter lint and fine particulate matter out of a stream of liquid delivered to the pan from above. The pan has a bottom wall and a peripheral upwardly extending side wall, and one of these walls has at least a portion formed with a substantial number of openings extending therethrough so as to filter lint from the stream. In addition, one of the walls, which may either be the same wall or the other wall, also has a portion thereof formed with a substantial number of openings, much smaller than the openings in the first mentioned portions, arranged in a surface which is discontinuous relative to the first mentioned portion. Preferably, the second portion with the smaller openings is formed in a depression relative to the first portion.

In this way each of the portions provides a path for part of the liquid. The result is that a substantial amount of filtering of the fine particulate matter will be achieved by the portion with the very small openings, and whatever cannot be accommodated by this portion will pass through the lint filtering portion. Thus, there is some filtering achieved on all of the stream, and in addition part of the stream receives filtering of the fine particulate matter.

The very small openings are preferably provided by forming the pan so that it may receive and retain a sheet of filter material which then becomes a part of the pan for the one or more washing operations, but may quickly be disposed of subsequently. Such material may, for instance, be provided as strips of suitably porous paper which may be bought at low cost.

The subject matter which we regard as our invention is particularly pointed out and distinctly claimed in the concluding portion of this specification. Our invention, however, both as to organization and method of operation together with further objects and advantages thereof, may best be understood by reference to the following description taken in conjunction with the accompanying drawings.

In the drawings:

FIGURE 1 is a side elevational view of a clothes washing machine in which our invention is incorporated, the view being partially broken away and partially in section to illustrate details;

FIGURE 2 is an enlarged fragmentary side elevational view of the top of the agitator of the washing machine of FIGURE 1, with our improved filter pan mounted thereon;

FIGURE 3 is a view similar to FIGURE 2 showing a second embodiment of our invention; and FIGURE 4 is a fragmentary plan view of the pan shown in FIGURE 3.

Referring now to FIGURE 1, we have shown our invention incorporated in an automatic washing machine, since this represents the intended use of our novel filter pan and, in fact, there is a novel and useful relationship between the various parts of the washing machine and the filter pan itself. In FIGURE 1, there is shown an agitator-type clothes washing machine 1 having a conventional basket or clothes receiving receptacle 2, provided over its side and bottom walls with perforations 3 and disposed within an outer imperforate tub or casing 4. Tub 4 serves as a liquid receptacle, the basket and tub together serving in effect as container means for clothes and the liquid in which they are to be washed and rinsed. Basket 2 may be provided with a suitable clothes retaining member 5 for preventing clothes from being floated over the top of the basket and with a balance ring 6 to help steady the basket when it is rotated at high speed.

Tub 4 is rigidly mounted within an appearance cabinet 7 which includes a cover 8 hingedly mounted on the top portion 9 of the cabinet for providing access through an opening 10 to the basket 2. A gasket 11 may be provided so as to form a seal between the top of tub 4 and portion 9 of the cabinet thereby to prevent escape of moisture and moist air into the cabinet around the tub. The rigid mounting of tub 4 within cabinet 7 may be effected by any suitable means. As a particular example of one such means, we have provided a plurality of rigid strap members 12, each of which is secured at one end to an inturned flange 13 of the cabinet and at its other end to the outside of tub 4.

At the center of basket 2 there is positioned a vertical axis agitator 14 which includes a center post 15 and a plurality of curved water circulating vanes 16 joined at their lower ends by an outwardly flared skirt 17. It can readily be seen that the top 18 of the agitator extends up above the maximum water level which can be reached in tub 4 and basket 2, the water level being controlled in a conventional manner as will be set forth herebelow.

Both basket 2 and agitator 14 are rotatably mounted. The basket is mounted on a flange 19 of a rotatable hub 20. The agitator 14 is mounted on a shaft (not shown) which extends upwardly through hub 19 and through the center post 15, and is secured to the agitator so as to drive it.

During a typical cycle of operations of machine 1, water is introduced into tub 4 and basket 2, and agitator 14 is then oscillated back and forth on its axis, that is, in a horizontal plane within the basket. This causes washing of the clothes by effecting relative motion of the clothes and the liquid, as well as suitable flexing of the fabric of the clothes. Then, after a predetermined period of this washing action, basket 2 is rotated at high speed to extract centrifugally the washing liquid from the clothes and discharge it to drain. Following this extraction operation, clean water is introduced into the basket 2 for rinsing the clothes and the agitator is again oscillated. Finally, the basket is once more rotated at high speed to extract the rinse water.

Basket 2 and agitator 14 may be driven through any suitable means. By way of example, we have shown them as driven from a reversing motor 21, shown in lower portion of FIGURE 1, through a system including a clutch 22 mounted on the motor shaft. A suitable belt 23 transmits power from clutch 22 to a transmission assembly 24 through a pulley 25. Thus, depending upon the direction of motor rotation of motor 21, pulley 25 of transmission 24 is driven in opposite directions. The transmission 24 is so arranged that it supports and drives both the agitator drive shaft and basket mounting hub 20. When motor 21 is rotated in one direction, the transmission causes agitator 14 to oscillate in a substantially horizontal plane within basket 2. Conversely, when motor 20 is driven in the opposite direction, the transmission rotates wash basket 2 and agitator 14 together at high speed for centrifugal liquid extraction. It will be recognized that there are many well known mechanisms for effecting the type of motion described hereabove.

In addition to operating transmission 24 as described, motor 21 also provides a direct drive through a flexible coupling 26 to a pump structure, generally indicated at 27, which may include two separate pump units 28 and 29 both operated simultaneously by motor 21. Pump 28 has an inlet which is connected by a conduit 30 to an opening 31 formed at the lowermost point of tub 4. Pump 28 also has an outlet which is connected by a conduit 32 to a suitable drain (not shown). Pump 29 has an inlet connected by a conduit 33 to the interior of tub 4, and an outlet connected by a conduit 34 to a nozzle 35. The pumps are formed so that in the spin direction of motor rotation pump 28 will draw in liquid from opening 31 and discharge it through conduit 32 to drain, and in the other direction of rotation pump 29 will draw in liquid through conduit 33 and discharge it through conduit 34 and nozzle 35. Each of the pumps is substantially inoperative in the direction of rotation in which it is not used.

Nozzle 35 is positioned to discharge a stream of liquid down into the filter pan 36 of our invention. Pan 36 is secured to the top portion 18 of agitator 14 so as to be movable therewith. In this connection, and with reference to FIGURE 2, it will be seen that the center part of pan 36 is formed as an inverted cup, or pocket 37.

Pocket 37 may be provided with a lining 38 of any suitable material, such as rubber, so that the pan 36 is removably secured on top 18 of agitator 14, when it is positioned thereon, so as to move therewith. After discharge from nozzle 35, the liquid then passes through the openings in the filter pan, as will be fully described herebelow, and back into the basket 2.

The motor 21, clutch 22, transmission 24, basket 2 and agitator 14 form a suspended washing and centrifuging system which is supported by the stationary structure of the machine so as to permit isolation of vibrations from that stationary structure. Such vibrations occur primarily as a result of high speed spinning of basket 2 with a load of clothes therein, as mentioned above. While any suitable suspension structure may be used, one suitable structure includes a bracket member 39 with transmission 24 mounted thereon and motor 21 mounted to the underside thereof. The bracket member in turn is secured to upwardly extending rigid members 40, and each of the two upwardly extending members 40 is connected to a cable 41 supported from the top of the machine. While only a portion of the suspension system is shown in FIGURE 1, such a vibration isolating system is fully described and claimed in Patent 2,987,190, issued on June 6, 1961, to John Bochan and assigned to General Electric Company, assignee of the present invention.

In order to accommodate the movement which occurs between basket 2 and tub 4 without any danger of leakage between them, the stationary tub 4 is joined to the upper part of transmission 24 by a flexible boot member 42. Boot 42 may be of any suitable configuration, many of which are known in the art, to permit relative motion of the parts to which it is joined without leakage therebetween.

Hot and cold water may be supplied to the machine through conduits 43 and 44 which are adapted to be connected respectively to sources of hot and cold water (not shown). Conduits 43 and 44 extend into a conventional mixing valve structure 45 having solenoids 46 and 47. Energization of solenoid 46 permits passage of hot water through the valve to a hose 48 and outlet 49 for filling the tub, energization of solenoid 47 permits passage of cold water through the valve to outlet 49, and energization of both solenoids permits mixing of hot and cold water in the valve and passage of warm water to hose 48. Hose 48 has an outlet 49 positioned to discharge into basket 2. Thus, when one or both of the solenoids 46 and 47 are energized, water passes into basket 2 and tub 4.

The level to which water rises in the basket and tub may be controlled by any suitable liquid level sensing means; in one typical arrangement for doing this, an opening 50 is provided in the side of tub 4 adjacent the bottom thereof. Opening 50 is connected through a conduit 51 and a tube 52 to a conventional pressure sensitive switch (not shown) which may be positioned in the control panel 53 of machine 1. As the water rises in basket 2 and tub 4, it exerts increasing pressure on the column of air trapped in tube 52 and at a predetermined pressure level the column of air then operates the pressure sensitive switch to shut off whichever of solenoids 46 and 47 may be energized. It will be understood that this occurs when the water is at a level within tub 4 which, at a maximum, is substantially below the clothes retainer member 5 and the filter pan 36.

Backsplasher 53, referred to as "control panel 53" above, may have suitable manually operated members such as that shown at 54. Members 54 may be used to control, for instance, washing and spin speed, water temperature, water level within tub 4 and basket 2, etc., for the washing of different types of fabrics.

The foregoing describes a complete washing machine so that the application of our invention and its relationship to the remainder of the components of the machine may better be understood.

Referring now to FIGURE 2, our improved filter pan may be made of any suitable material, such as, for instance, formed metal or a molded plastic. It is formed with a bottom wall 55 surrounded by a peripheral upstanding side wall 56. In the embodiment of FIGURE 2, bottom wall 55 has an outer annular portion 57 and a separate inner annular portion 58 in a surface substantially discontinuous relative to portion 57. More specifically, portion 58 is substantially below portion 57, being separated therefrom by a generally vertical imperforate wall 59 so that there is formed a depression 60 above bottom portion 58.

Bottom portion 57 is provided with a substantial number of openings 61 which are so designed and sized as to permit the passage of water therethrough while preventing the passage of lint. It has been found that this type of structure, when the pan is kept in motion, causes the lint to ball up into wads, which are readily removable; this is as opposed to the usual effect, in lint filters, of eventual clogging of the openings of the filter. The details of this type of structure are more fully described and claimed in Patent 2,481,979, issued to Russell H. Colley on September 13, 1949, and assigned to the General Electric Company, owner of the present invention.

In one practical embodiment of the Colley invention, presently incorporated in washing machines produced and sold by applicants' assignee, the openings are circular, with a diameter between .034 and .038 inch at the top, and between .045 and .060 inch at the bottom, the plastic pan having a bottom thickness of .093 inch. This example is merely intended to be illustrative of the general type of opening size suitable for openings 61 to effect the filtering of lint, and the present invention is not restricted thereto, of course.

Surface 58 has openings 62 therein which are preferably somewhat larger than openings 61, approximating .070 inch in diameter. In addition, these openings are spaced from each other by upstanding ribs 63 whose tops, together with the outer edge 64 and the inner edge 65 of depression 60, form a receiving surface for an annular strip 66 of porous, or fibrous, material. By porous or fibrous is meant a material which has very small openings formed therethrough so that water may pass through, but where the openings are small enough so that a filtering effect is obtained on the fine particulate matter which heretofore has merely been left in the water. For instance, in one operative structure, strips of air cleaner type wet-strength filter paper were used. Such material has countless tiny openings passing therethrough, the openings being almost too small to measure but readily capable of passing water while filtering out the small particulate matter previously mentioned.

It will be seen that the depression 60 forms a receiving platform for strip 66, so that a strip is properly retained therein during use of machine 1, but may readily be removed by an operator simply by pulling the strip out at the end of one or more operations. In this way, disposable strips may be inserted into depression 60 whenever a washing operation is to be provided where it is important that the particulate matter be removed. This is true, for instance, in the case of fine white garments in which any grayish cast can be noticed.

In effect, what happens is that when the stream of water passes from nozzle 35 into pan 36 there are two entirely different phenomena occurring above surfaces 57 and 58. Above surface 57, there is only a thin layer of highly turbulent water, the condition which leads to the balling up of lint as desired. In depression 60, however, water will tend to accumulate since it cannot pass through the strip 66 nearly as readily as it can through openings 61. As a result, there will be a filtering of the water in the depression, the filtering action being enhanced by the head of water which accumulates therein. Any overflow of this water will join the water passing through openings 61 in bottom portion 57.

An important result of the provision of depression 60 is the head of water that forms therein as a result of normal use of the filter pan. The pores, or openings, in strip 66 are so fine that, to get as much water as possible through it, it is highly desirable to have the pressure of a head of liquid. This helps to force water through the filter. Thus, depression 60, in addition to holding strip 66, provides the further important function of causing a head of water to be provided above the strip in order to help force water through it. This results in a substantial gain in the filtering effectiveness of strip 66.

Another result of providing a head of water in depression 60 is the prevention of a waterfall effect from portion 57 to portion 58. This could result in causing excessive suds generation with many present day detergents; such a problem is obviated by having the depression 60 substantially full of water so that no waterfall effect can exist.

Thus, the water takes either one of two paths: it either passes through the openings 61 so that lint is filtered therefrom; or it passes through the tiny openings in strip 66 so that virtually all particulate matter is removed therefrom.

It will be recognized that some types of clotihng may be washed without the need for the extremely fine filtering action of strip 66. In such cases, the operator of the machine may well decide not to utilize a strip 66. In such cases, it is highly desirable that the bottom portion 58 be formed so that it does not become clogged with lint. This is found to be best accomplished by the configuration shown, wherein the openings 62 are slightly larger than the openings 61, and are separated by the ribs 63.

The size of the openings and spacing thereof, with ribs 63 therebetween, is such that no one strand of ordinary lint can span the distance from one hole to the other. This is found to be the main condition which causes clogging of the openings to start if there is any accumulation of water above the openings. Such accumulation does normally result in depression 60, even with the openings 62 being as large as they are.

In other words, where a thin covering of turbulent water does not exist, as it does above portion 57, it is necessary to provide a specially formed surface such as that of portion 58 to preclude the clogging of the openings; this represents a highly desirable aspect of our improved filter pan. What will occur, then, is that when strip 66 is not used filtering action on lint still occurs above portion 57. Water passing through portion 58 will not cause any clogging of the openings 62 because the size and spacing of these openings precludes this from happening.

In summary, it will be seen that the structure of FIGURE 2 provides a filter pan having two separate filtering portions which cooperate so that part of the stream entering the pan is passed through each portion. One portion filters only lint, and does so in the way contemplated in the Colley patent so that the lint is balled up and does not clog the openings. The other portion filters fine particulate material and is so arranged and positioned that the operator may quickly and easily remove the strip of filter material at the end of each operation if such a strip has been used. In addition, the pan is formed so that if the operator decides not to use a strip of filter material for a particular operation, the second portion of the filter pan will not become clogged with lint.

Referring now to FIGURES 3 and 4, there is shown a second embodiment of our invention. It will be understood that the second embodiment may be incorporated in a washing machine such as that shown in FIGURE 1, precisely in the same way as the filter pan 36. In addition, all parts which are identical to those parts shown in FIGURES 1 and 2 are provided with the same numerals.

The filter pan 67 of FIGURES 3 and 4 may be held on the agitator top 18 in the same way as previously described. In this case, the filter pan has an inner annular perforated bottom portion 68, provided with a substantial number of openings 69. An annular depression 70 is provided around portion 68 by virtue of a downwardly extending wall 71 which joins portion 68 to the bottom of the depression 70. The other wall of the depression is formed by the outer peripheral upstanding wall 72 of the filter pan. Wall 72 is provided with a substantial number of equally spaced generally vertically extending passages 72a separated by ribs 73. The inner portions of these ribs form a surface against which a strip of material 74 may seat to provide the same filtering function for fine particulate matter as previously described, with the depression 70 then becoming imperforate except for the strip 74.

In effect, what happens is that the stream of water delivered to pan 67 has a part thereof passing through the openings 69 of bottom portion 68 so as to filter lint. Another portion collects in depression 70, so as to form a head of water, and passes somewhat more slowly through the very small openings in strip 74 so as to be filtered thereby; this part of the water then passes down through the passages 72a out of the pan. Thus, again there are two separate paths provided by the two separate parts of the pan, and again the two parts of the pan are provided in surfaces discontinuous relative to each other so that strip 74 may be retained in position in a depression in the pan. The dual action of removal of lint for part of the stream and removal of fine particulate matter for the remainder of the stream is effected.

It will be seen that in addition to the novel configuration and the many novel aspects of the filter pan itself, the relationship of the pan to the machine in which it is used may also present novel aspects when it is provided in a machine such as that shown in FIGURE 1. Thus, for instance, the particular shape of the bottom portion 58 of the pan in the embodiment of FIGURE 2, and the fact that the pan is mounted on a moving agitator, results in lint removal—even when no filter strip is provided—with no clogging whatsoever. Therefore, because of the way that the pan coacts with the other parts of the machine, it may either filter the fine particulate material as well as the lint, or lint alone without any clogging of the openings of the pan. In addition, because of the relationship to the other parts of the machine, the removable strip is directly in front of the operator and readily accessible when the lid of the machine is opened, so that an operator may merely reach down, pick the strip up, and discard it when it becomes too clogged with particulate soil. The machine is then ready for another operation without a strip, or if the operator desires to have particulate filtering achieved in the next washing cycle, then another strip may immediately be inserted.

While in accordance with the patent statutes we have described what at present are considered to be the preferred embodiments of our invention, it will be obvious to those skilled in the art that various changes and modifications may be made thereto without departing from the invention, and we therefore aim in the appended claims to cover all such changes and modifications as fall within the true spirit and scope of the invention.

What we claim as new and desire to secure by Letters Patent of the United States is:

1. A filter pan adapted to filter lint and fine particulate matter out of a stream of liquid delivered into said pan from above, said pan being formed with a bottom wall and an imperforate peripheral upwardly extending side wall, said bottom wall having an annular portion thereof formed with a substantial number of openings extending therethrough to filter lint from said stream, said bottom wall having a second portion thereof formed with a substantial number of openings therethrough and formed to receive and retain a sheet of filter material in a surface which is discontinuous relative to said first mentioned portion whereby each of said portions provides a path for part of the liquid.

2. A filter pan adapted to filter lint and fine particulate matter out of a stream of liquid delivered into said pan from above, said pan being formed with a bottom wall and a peripheral upwardly extending side wall, said bottom wall having a first portion thereof formed with a substantial number of openings extending therethrough to filter lint from said stream, said bottom wall also having a second portion thereof formed with a substantial number of openings therethrough at a lower level forming a depression relative to said first portion, said second portion being formed to receive and retain a sheet of filter material whereby each of said portions provides a path for part of the liquid and liquid accumulates in said depression to provide a head therein.

3. The filter pan defined in claim 2 wherein said first portion is formed as an annular portion and said second portion is radially inward thereof.

4. A filter pan adapted to filter lint and fine particulate matter out of a stream of liquid delivered into said pan from above, said pan being formed with a bottom wall and a peripheral upwardly extending side wall, said bottom wall having at least a portion thereof formed with a substantial number of openings extending therethrough to filter lint from said stream, said bottom wall and said side wall cooperatively forming an annular depressed portion radially outwardly of said first mentioned portion, said depressed portion having a substantial number of openings formed in said side wall, said depressed portion being formed to receive and retain a sheet of filter material in communication with said opening in said side wall whereby each of said portions provides a path for part of the liquid and liquid accumulates in said depression to provide a head therein.

5. A filter pan adapted to filter lint and fine particulate matter out of a stream of liquid delivered into said pan from above, said pan being formed with a bottom wall and a peripheral upwardly extending side wall, one of said walls having at least a portion thereof formed with a substantial number of openings extending therethrough to filter lint from said stream, one of said walls having at least a portion thereof formed with a plurality of openings larger than the openings in said first mentioned portion and in a surface which is discontinuous relative to said first mentioned portion, said last mentioned portion including ribs extending between the openings therein, said last mentioned portion being formed to receive on said ribs a sheet of filter material having a substantial number of openings much smaller than the openings in said first mentioned portion whereby each of said portions provides a path for part of the liquid, said last mentioned portion providing for filtering of fine particulate matter when said sheet is positioned thereon.

6. The filter pan defined in claim 5 wherein both said portions are in said bottom wall, said last mentioned portion being formed as a depression relative to said first mentioned portion so that liquid accumulates in said depression to provide a head therein.

7. For use in a washing machine of the type having a clothes receiving receptacle, a movable clothes washing agitator extending upwardly into said receptacle, and a recirculation system for recirculating a stream of liquid from said receptacle toward the top of the agitator: a filter pan adapted to filter lint and fine particulate matter out of the stream of liquid landing in said pan from above, said pan being formed with a bottom wall, an imperforate peripheral upwardly extending side wall, and an imperforate inverted pocket extending upwardly at the center of said bottom wall, said pocket being formed and adapted to receive the top of said agitator so as to retain said pan thereon, said bottom wall having a first portion thereof formed with a substantial number of openings extending therethrough to filter lint from said stream, said bottom wall having a second portion thereof formed as a depression relative to said first portion with a plurality of openings extending therethrough, said second portion being formed to receive and retain a sheet of filter material in said depression whereby each of said first and second portions provides a path for part of the liquid and liquid accumulates in said depression to form a head therein.

8. For use in a washing machine of the type having a clothes receiving receptacle, a movable clothes washing agitator extending upwardly into said receptacle, and a recirculation system for recirculating a stream of liquid from said receptacle toward the top of the agitator: a filter pan adapted to filter lint and fine particulate matter out of the stream of liquid landing in the pan from above, said pan being formed with a bottom wall, a peripheral upwardly extending side wall, and an imperforate inverted pocket extending upwardly at the center of said bottom wall, said pocket being formed and adapted to receive the top of said agitator so as to retain said pan thereon, said bottom wall having at least a portion thereof formed with a substantial number of openings therethrough to filter lint from said stream, said bottom wall and said side wall cooperatively forming an annular depressed portion radially outwardly of said first mentioned portion, said depressed portion having a substantial number of openings formed in said side wall, said depressed portion being formed to receive and retain a sheet of filter material in communication with said openings in said side wall whereby each of said portions provides a path for part of the liquid and liquid accumulates in said depressed porton to provide a head therein.

References Cited by the Examiner

UNITED STATES PATENTS

| 1,130,430 | 3/15 | Potterf | 68—18.1 |
| 1,657,482 | 1/28 | Pine | 68—208 X |
| 2,329,356 | 9/43 | Moore. | |
| 2,360,570 | 10/44 | Mattoon | 210—497 |
| 2,973,636 | 3/61 | Devery et al. | 68—17 |
| 2,983,130 | 5/61 | Pinder | 68—18.1 |
| 3,041,864 | 7/62 | Czech | 68—18.1 |

FOREIGN PATENTS

| 112,991 | 4/41 | Australia. |

IRVING BUNEVICH, *Primary Examiner.*